US010056978B2

(12) United States Patent
Mattos et al.

(10) Patent No.: US 10,056,978 B2
(45) Date of Patent: Aug. 21, 2018

(54) TECHNIQUES FOR PROVISIONING NETWORK ELEMENTS OF A DATA COMMUNICATIONS NETWORK (DCN) AND AN OPTICAL COMMUNICATION SYSTEM USING THE SAME

(71) Applicant: TYCO ELECTRONICS SUBSEA COMMUNICATIONS LLC, Eatontown, NJ (US)

(72) Inventors: Roberto Mattos, Morganville, NJ (US); Richard Kram, Ocean, NJ (US); Jonathan M. Liss, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 99 days.

(21) Appl. No.: 15/178,848

(22) Filed: Jun. 10, 2016

(65) Prior Publication Data
US 2017/0359124 A1    Dec. 14, 2017

(51) Int. Cl.
*H04B 10/27*    (2013.01)
*H04L 29/12*    (2006.01)
*H04L 12/24*    (2006.01)
*H04J 14/02*    (2006.01)

(52) U.S. Cl.
CPC ............. *H04B 10/27* (2013.01); *H04J 14/02* (2013.01); *H04L 41/0803* (2013.01); *H04L 41/145* (2013.01); *H04L 61/2007* (2013.01); *H04L 41/0853* (2013.01)

(58) Field of Classification Search
CPC ...... H04B 10/27; H04J 14/02; H04L 41/0803; H04L 61/2007; H04L 41/145; H04L 41/0853
See application file for complete search history.

(56) References Cited

U.S. PATENT DOCUMENTS

| 6,680,948 B1 * | 1/2004 | Majd ....................... H04L 12/56 370/401 |
| 7,188,160 B2 | 3/2007 | Champagne et al. |
| 7,590,072 B2 | 9/2009 | Radi et al. |
| 7,701,955 B1 * | 4/2010 | Saunders ................ H04L 12/56 370/355 |
| 8,762,355 B2 | 6/2014 | Gutjahr et al. |

(Continued)

*Primary Examiner* — Walli Butt

(57) ABSTRACT

Techniques for managing a data communication network (DCN) are disclosed, in accordance with an embodiment, and provide planning, maintenance, and validation (e.g., auditing) functionality for the purpose of managing network elements across a plurality of stations/locations associated with an optical communication network. In accordance with an embodiment, a computing device includes a DCN configuration interface and engine. The DCN configuration interface enables modeling of a DCN based on a plurality of user-provided parameters and constraints. The DCN configuration interface may then generate settings files in accordance with the DCN model. The DCN configuration interface further allows previously-generated configuration files to be read in for the purpose of performing updates, adding new stations, new network elements, new equipment types, new equipment models, and so on. Therefore, the DCN configuration interface disclosed herein reduces or eliminates address conflicts and other misconfigurations during provisioning.

20 Claims, 9 Drawing Sheets

(56) References Cited

U.S. PATENT DOCUMENTS

| | | | |
|---|---|---|---|
| 2002/0095688 A1* | 7/2002 | Rich | H04B 1/745 725/116 |
| 2003/0005104 A1 | 1/2003 | Deboer et al. | |
| 2003/0065761 A1* | 4/2003 | Cereja | H04L 29/06 709/223 |
| 2003/0112765 A1* | 6/2003 | Gaspard | H04L 41/0213 370/252 |
| 2007/0211649 A1* | 9/2007 | Hauenstein | H04L 41/0869 370/254 |
| 2008/0201462 A1* | 8/2008 | Liss | H04L 41/00 709/223 |
| 2013/0182712 A1* | 7/2013 | Aguayo | H04L 12/4633 370/395.53 |
| 2017/0005923 A1* | 1/2017 | Babakian | H04L 69/324 |
| 2017/0093758 A1* | 3/2017 | Chanda | H04L 49/35 |

* cited by examiner

TECHNIQUES FOR PROVISIONING NETWORK ELEMENTS OF A DATA COMMUNICATIONS NETWORK (DCN) AND AN OPTICAL COMMUNICATION SYSTEM USING THE SAME

TECHNICAL FIELD

The present disclosure relates to optical communication systems, and in particular, to provisioning and management of a plurality of network elements within an optical communication system.

BACKGROUND

Network management may be conducted at different levels in various types of optical networks to avoid network failures and to assure network performance. In a communication network, an element management system (EMS) may be used to supervise and manage network elements within a network. A communication network may also include a network management system (NMS) to manage the overall network by communicating with several EMSs.

In an optical communication system such as a wavelength division multiplexed (WDM) system, for example, terminal or cable stations may be interconnected by cable segments to form a network. The network elements in an optical communication system may include equipment located at a cable station (e.g., terminal equipment and power feed equipment, computers, phones, printers and so on) as well as equipment connected to the cable station (e.g., repeaters and equalizers). In such a system, an EMS may be located at a cable station (or at a separate location) and used to manage the network elements associated with this cable station. The EMS may include one or more servers for performing the element management functions and one or more workstations for providing a user interface (e.g., to display the information associated with the network elements managed by the EMS). An NMS may be located at one of the cable stations or at a separate location for managing the overall optical communication system or network.

Provisioning of the network elements in an optical communication system is often complicated by the number of different types of equipment and equipment models. Any misconfiguration, such as a conflicted internet protocol (IP) address, may lead to a loss of connectivity to that network element, or worse yet, to entire segments of an optical communication system. Therefore, initial provisioning and on-going maintenance (e.g., adding new devices, replacing defective device) of an optical communication system raises numerous non-trivial challenges.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
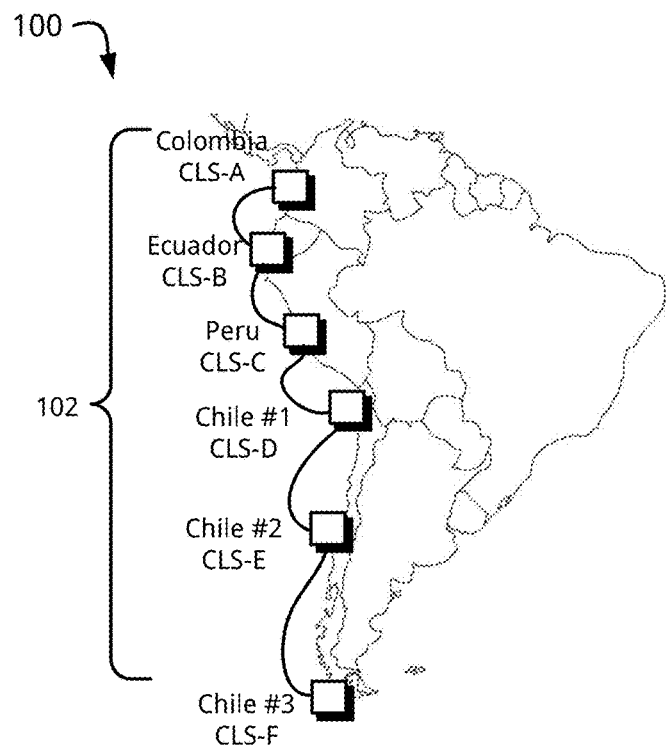
FIG. 1 shows an example optical communication system deployed in a geographically distributed manner in accordance with an embodiment of the present disclosure.

Techniques for managing a data communication network (DCN) are disclosed, in accordance with an embodiment, and provide planning, maintenance, and validation (e.g., auditing) functionality for the purpose of managing network elements across a plurality of stations/locations associated with an optical communication network. Aspects and embodiments disclosed herein may be implemented, e.g., as software, in a laptop or other computing device, and/or as a configuration component in a NMS computer server. Each NMS computer server may include EMS functionality. For the purpose of simplicity and clarity, aspects and embodiments herein refer to NMS computer servers, although some functionalities may be provided by EMS components.

In accordance with an embodiment, a computing device includes a DCN provisioning interface, which may also be referred to as a DCN provisioning engine interface. The DCN configuration interface provides, for example, an application program interface (API) to a DCN provisioning engine, with the DCN provisioning engine being implemented to perform the various configuration processes disclosed herein. The computing device may use the DCN configuration interface during initial project design, and during staging of an optical communication system prior to deployment in the field. In addition, the DCN configuration interface may be utilized after deployment of an optical communication system for the purpose of adding new stations, new network elements, new equipment types, and new equipment models, for example.

In some embodiments, a graphical user interface (GUI) of the DCN configuration interface may be configured to, in a general sense, "model" a DCN by allowing a user to enter and/or load a plurality of parameters and constraints in order to define and configure stations and associated network elements. Thus, a user may input various system-wide parameters for the DCN, e.g., an IP address range, a wide area network (WAN) access point, a total number of stations, and a total number of Overhead (OH) channels (e.g., optical channels used to transmit data between stations). Likewise, the GUI allows the user to further perform fine-grain modification at targeted, per-station level. For example, a user may adjust a subnet and subnet mask associated with a given station and select a number of devices, also known as network elements, which will be physically located at the given station once the optical communication system is deployed. Some example non-limiting network elements include routers, switches, amplifiers, phones, printers, wireless access points, workstations, laptops, time servers, and any other device capable of network communication via a DCN. The GUI further allows a user to assign a number of point-to-point destinations for each site to support inter-site communication and routing, which will be discussed in greater detail below.

As generally referred to herein the term station refers to any location of the optical communication system having one or more network elements including, but not limited to, Termination Stations (TSs), Network Operation Centers (NOCs), Remote Operation Positions (ROPs), and Terminal Repeater Bays (TRBs). Each location may include different types of network elements and supporting systems/hardware depending on their location type. For instance, a cable station (or terminal station) may have only terminating equipment such as power feed equipment (PFE) and terminal line amplifiers (TLAs). In other cases, cable stations or the like may also further include servers, routers, switches, and so on. On the other hand, locations such as ROPs and NOCs generally have no servers that facilitate management and communication via an optical communication system, and instead may be configured to perform remote system management of the equipment within a given location or group of locations. Likewise, a TRB site may be a "hut" or other small location that may be used to extend a terrestrial connection from a point of presence (POP) (e.g., where main transmission equipment is located) to the terminal station, which is sometimes near the landing where PFE and TLA equipment is located. Thus, a TRB site may contain only a router used to provide communication with to the TRB site. In any event, an optical communication system may contain one or more types of locations, including those not necessarily discussed above. Thus, the techniques disclosed herein are configured to accommodate provisioning of network elements across a range of locations and location configurations in addition to being configurable in order to add new location types.

The GUI, and more specifically the DCN configuration interface, may also support validation and auditing of DCN configuration parameters in order to identify address conflicts, hostname conflicts, and/or other misconfigurations. For example, the GUI may alert the user if two or more network elements share an IP address or hostname, and thus are in conflict. Once the DCN is modeled and validated/audited, the GUI supports the generation of settings files in order to produce a set of configuration files that may be provided to the network elements. The generation of settings files may be performed in a so-called "bulk" manner whereby a separate settings file is created for each network element via a single step/operation. However, other embodiments are also within the scope of this disclosure. For example, a user may export a single configuration file for a selected network element, or a subset of configuration files for, example, one or more selected stations. The GUI may also perform exporting by presenting a report, e.g., via a visualized window or popup, that may be printed or saved as a separate file for later use. Numerous other export options will be apparent in light of this disclosure and the provided examples should not be construed as limiting.

Thus, the DCN model may be implemented into an optical communication system by virtue of the generated settings files being used to provision the network elements of the DCN. In some cases, exported settings files may be formatted in a manner that is compatible with a target network element. For example, exporting of settings files may include formatting that is compatible with the manufacturer's specific file format. The GUI may utilize a database of known network element types, models and manufacturers when selecting a particular format to export to. Distribution of the settings files may include, for example, manual installation by a technician. In other cases, distribution includes transmitting settings files via a network connection (e.g., via file transfer protocol (FTP), file sharing, serial data link, and so on), or by portable media such as a USB flash drive or portable hard drive.

Thus, aspects and embodiments disclosed herein enable conflict-free and simplified provisioning of a DCN, and more particularly, the provisioning of network elements in an optical communication system. This advantageously overcomes inefficiencies and misconfigurations that may be introduced by other approaches to DCN provisioning, such as manual approaches or computer-based approaches (e.g., network planning tools) that are unable to model a DCN in a complete, top-down fashion. Thus, the techniques disclosed herein may be understood to improve the operation of a distributed network, namely a DCN implemented by an optical communication system, as conflicts and misconfigurations may be reduced or otherwise eliminated.

The expressions "optically communicates" and "optically coupled" as used herein refer to any connection, coupling, link or the like by which optical signals carried by one optical system element are imparted to the "communicating" or "coupled" element. Such "optically communicating" or "optically coupled" devices are not necessarily directly connected to one another and may be separated by intermediate optical components or devices. Likewise, the terms "connected" or "coupled" as used herein in regard to physical connections or couplings is a relative term and does not require a direct physical connection.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Example Optical Communication System

Figure 2:
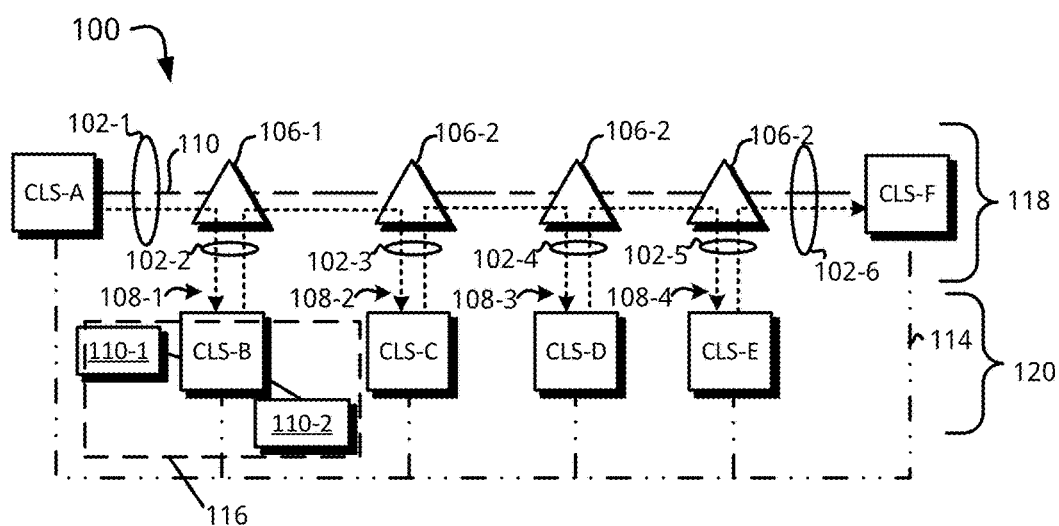
FIG. 2 shows a block diagram of the example optical communication system of FIG. 1 in accordance with an embodiment of the present disclosure.

Now turning to the Figures, FIG. 1 illustrates one example of an optical communication system 100 in accordance with an embodiment of the present disclosure. The optical communication system 100 is shown in a highly simplified form for clarity and practicality. As shown, the optical communication 100 includes an optical fiber cable collectively shown as 102 that spans a relatively large geographic distance. The optical fiber cable 102 may comprise, for example, an undersea optical network that includes a plurality of cable segments, 102-1 to 102-6 (FIG. 2). The undersea optical network may thus comprise a plurality of "wet" optical components that are disposed along the sea floor or disposed on a sea-based platform, for example. However, cable segments are not necessarily limited in this regard and the optical communication system 100 may include, at least in part, some lengths of land-based optical fiber segments. The optical communication system 100 may include a plurality optical components such as, for example, optical amplifiers, repeaters, branching units (BUs), BUs with optical add/drop multiplexers (OADM), and power feed BUs, just to name a few. As further shown, each optical cable segment extends between adjacent cable landing stations (CLSs). Although examples and scenarios disclosed herein refer to stations or CLSs, the disclosure is not necessarily limited in this regard. For example, the techniques disclosed herein are equally applicable to any station located within the optical transceiver system including, for example, Network Operation Centers (NOCs) and Remote Operation Positions (ROPs), just to name a few.

Turning to FIG. 2, a block diagram shows the optical communication system 100 in further detail. The cable segments 102-1 and 102-6 form a trunk path 110 and the cable segments 102-2 to 102-5 form branch paths 108-1 to 108-4, respectively. The cable segments 102-1 to 102-6 include one or more optical fibers for carrying optical signals. One or more repeaters (not shown) may also be coupled to the cable segments within the trunk path 110 and/or branch paths 108-1 to 108-4 to amplify the optical signals. Although the illustrated embodiment shows communication in one direction between certain cable stations, each of the cable segments may include optical fiber pairs providing optical paths for bi-directional communication between any of the cable stations CLS-A to CLS-F. The components in the trunk path 110 and branch paths 108-1 to 108-4 may include various configurations for achieving their intended functionality.

Each of the cable landing stations, CLS-A to CLS-F, may house various components, also generally referred to as elements, that enable optical data transmission such as line terminating equipment (LTE), amplifiers, network management systems (NMSs), and so on. Likewise, each of the cable landing stations may include related elements that support, for example, general-purpose and specific-purpose tasks. For instance, cable landing stations may include voice-over-IP (VoIP) phones, computer systems, and network equipment such as Ethernet routers to support voice and data communications between stations, and between stations and a wide area network, such as the Internet. Such equipment may be dedicated to support specific-purposes tasks including cable monitoring, security monitoring, and system administration. However, the optical communication system 100 is not necessarily limited in this regard and may support generalized tasks such as Internet browsing and standard telecom, e.g., inbound and outbound calling. In any event, elements may include Ethernet hardware, e.g., one or more network interface cards (NICs), that enables communication via TCP/IP or other suitable communication protocols. Accordingly, some elements may be accurately referred to as network-based elements, or network elements, and may be assigned IP addresses, e.g., IPv4 and/or IPv6, that enable inter-system communication, e.g., between stations, and intra-system communication, e.g., between stations and hosts located on an external wide-area network such as the Internet. Such network elements include, but are not limited to, workstation computers, servers, network routers, optical transceivers, VoIP phones, printers, wireless access points, network switches, laptops, and network time servers.

To this end, the optical communication system 100 may support Ethernet connectivity by providing an Ethernet emulation scheme that transparently provides data connectivity and routing using overhead (OH) channels, e.g., predetermined channel wavelengths, that are transmitted via one or more pairs of optical fibers within each optical fiber segment 102-1 to 102-6. In these implementations, the overhead channels may thus be accurately referred to as optical Ethernet channels when used to transmit and receive Ethernet packets. Each optical Ethernet channel may support, for example, 10 megabits per second (Mbps/s) or more. The termination points for these optical Ethernet channels may include hardware line cards that, essentially, "break out" each optical Ethernet channels into physical ports that may be coupled to, for example, standard RJ-45 connectors. Thus, Ethernet routers may seamlessly integrate with the optical Ethernet channels to provide network connectivity between elements located in different stations, and also between network elements and hosts coupled to wide-area networks (e.g., the Internet). To this end, the optical communication system 100 may provide a data communications network (DCN) at least in part by the optical Ethernet channels. The optical communication system 100 may implement the DCN on-cable, such as via cable segments 102-1 to 102-6. However, the optical communication system 100 may implement a portion of the DCN off-cable, such as by an off-cable network 114 which may include a terrestrial or satellite-based link, for example.

In an embodiment, the DCN may implement various network topologies to support Ethernet connectivity. In one specific example, the DCN implements a hybrid network topology whereby at a point-to-point subnet 118, which is shown via broken lines between each station along the trunk path 110, optical Ethernet channels are provisioned in a mesh-like (or ring) fashion and connect stations via direct, point-to-point connections. The hybrid topology of the DCN may further include a star topology within each local station subnet, which is discussed in further detail below. Thus, each station may be provisioned with an Ethernet IP address and hostname, and may be configured to couple to one or more other stations to form a point-to-point ring or mesh network. For example, CLS-A may be configured to couple to CLS-B, and CLS-B may be configured to couple to both CLS-A and CLS-C. Thus, an Ethernet packet originating from within CLS-A that is destined for a network element in CLS-B may be directly routed thereto through a mutually shared point-to-point connection via the station subnet. Likewise, an Ethernet packet originating from CLS-A that is destined for a network element in CLS-C may be indirectly routed via a point-to-point connection formed between CLS-A and CLS-B, and then through a point-to-point connection formed between CLS-B and CLS-C. The particular point-to-point connections defined by the DCN may be based on a desired configuration and should not be construed as limited to the examples provided above.

In any event, one or more "hops" may be traversed before a packet ultimately reaches its destination. In an embodiment, each of CLS-A to CLS-F are coupled in a web-like fashion such that every stations is coupled to every other station by at least one optical Ethernet port. In still other cases, the optical communication system 100 may implement a redundant configuration such that the DCN continues to operate even if one or more of the cable segments 102-1 to 102-6 is interrupted, e.g., cut. The redundancy may be accomplished by, for example, having alternate paths to each station both on-cable and off-cable, e.g., using the off-cable network 114.

Continuing on, and at the station subnets 120, each station may be configured with a local subnet, such as example subnet 116, that includes predefined maximum number of host addresses as a function of the particular subnet applied. Each station subnet 120 may be serviced by one or more routing devices or switches (not shown) at each of the stations CLS-A to CLS-F, which may handle both local intra-station switching of packets as well as inter-station communication and routing via the point-to-point subnet 118.

Each local station subnet 120 may service N number of host devices. For example, and as shown, the example subnet 116 includes network elements 110-1 and 110-2. Each of the network elements may include network interface circuitry configured with one or more Ethernet addresses, IPv4 and/or IPv6. Thus, each network element may communicate with other local network elements, or with remote network elements located at other CLS or other WANs. Thus, each CLS may provide a star-like topology based on each network element being coupled to an associated router/switch device.

As will be apparent in light of this disclosure, this hybrid topology complicates IP address provisioning. This is because at a top-level, which is to say the point-to-point connections provided by the optical Ethernet channels, each individual station may be assigned at least one unique IP address. Accordingly, the collective stations form a subnet that allows packets to be routed to an appropriate destination. Further, each station may be assigned a range of IP addresses to uniquely address each associated network element within a given local station subnet. Ensuring that each network element is assigned an address within the predetermined IP address constraints is important for avoiding conflicts or misconfigurations that may result in loss of IP connectivity. Likewise, ensuring that each station includes a correct and accurate list of IP addresses for point-to-point connections along the trunk path 110 advantageously enables path redundancy in the event of a fault, e.g., a cable segment cut or other interruption.

Example Network Management Server (NMS) with DCN Configuration Interface

Figure 3:
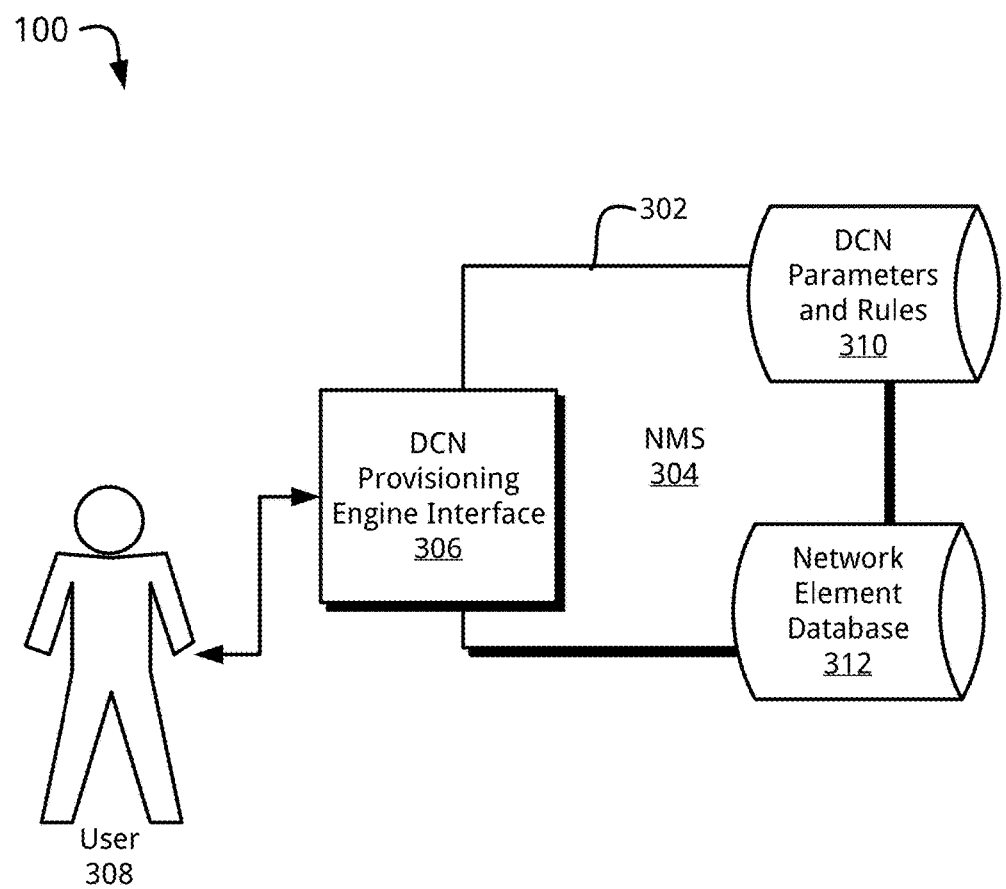
FIG. 3 shows a block diagram of a network management system (NMS) configured with a data communications network (DCN) configuration interface, in accordance with an embodiment of the present disclosure.

Turning to FIG. 3, a block diagram shows an example NMS system configured with a DCN configuration interface, in accordance with an embodiment of the present disclosure. As shown, the NMS 304 includes a DCN provisioning interface 306, a DCN parameters and rules database 310 and a network element database 312. The NMS system 304 may comprise a computing device, such as the computing device 900 of FIG. 9.

In an embodiment, the DCN provisioning interface 306 includes a graphical user interface (GUI), application program interfaces (APIs), interfaces and other components that allow the DCN provisioning interface 306 to receive user input from a user, such as from the user 308. The DCN provisioning interface 306 in a sense "wraps" various engines such as a DCN provisioning engine and audit engine and provides access to the engines via API calls. A computing system, such as the NMS server 304, may use the DCN provisioning interface 306 during various routines and processes, such as the processes 500 and 506 discussed further below with reference to FIGS. 5-8.

Accordingly, the NMS server 304 may derive a DCN model by providing a plurality of user-supplied DCN configuration parameters to the DCN provisioning interface 306. In turn, the DCN provisioning interface 306 may instantiate a DCN provisioning engine to derive the DCN model. As discussed further below, the DCN provisioning interface 306 may use the user-supplied DCN configuration parameters in combination with various constraints and parameters stored within a DCN parameters and rules database 310 to derive a particular DCN model. Therefore, and in a general sense, the derived DCN model virtually represents each network element of the optical communication system 100 and associates each network element with one or more IP addresses based on a priori knowledge of a desired network topology. The NMS server 304 may then use the DCN provisioning interface 306, e.g., via one or more API calls, to cause the same to audit the DCN model via an audit engine that may also be instantiated by the DCN provisioning interface 306. The NMS server 304 may further use the DCN provisioning interface 306, e.g., via one or more API calls, to cause the same to export configuration files for each network element in accordance with the derived DCN model.

DCN provisioning interface 306 The DCN provisioning interface 306 may be implemented using a high-level language such as C or C++, Java, C#, and so on. Some specific examples of a GUI interface provided by the DCN provisioning interface 306 are discussed in greater detail below with reference to FIGS. 4A-4C. Thus, the various processes disclosed herein, such as those of FIGS. 5-8, may be executed as software on a controller/processor of the NMS 304. However, this disclosure is not necessarily limited in this regard and the DCN provisioning interface 306 may be also implemented, in part or in whole, via hardware (e.g., hardcoded gate level logic or purpose-built silicon) or firmware (e.g., embedded routines executing on a microcontroller), or any combination thereof.

Figure 4A:
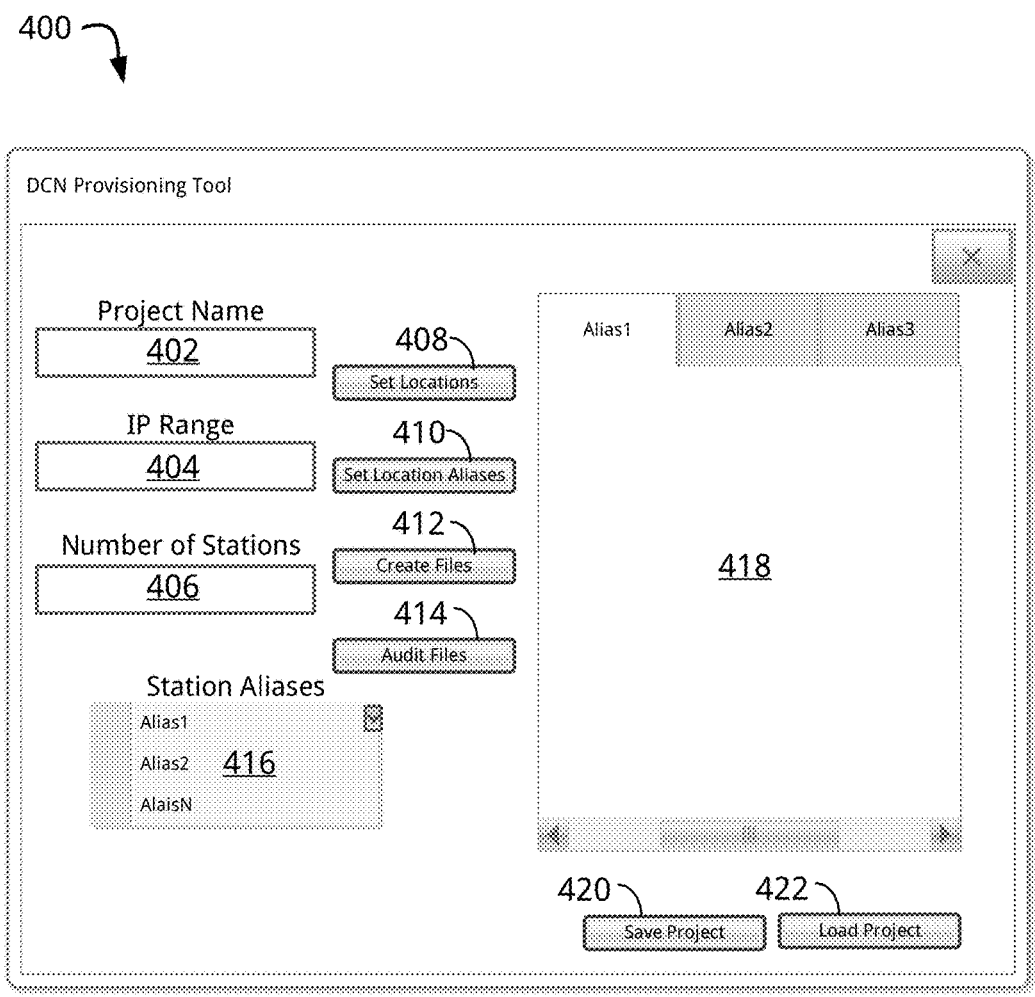
FIGS. 4A-4C collectively show an example graphical user interface (GUI) of the DCN provisioning engine interface of FIG. 3 in accordance with an embodiment of the present disclosure.

The DCN parameters and rules database 310 may include a plurality of configuration parameters and rules for a given optical communication system implementation. The DCN parameters and rules may be stored on a volatile (e.g., random access memory (RAM)) or non-volatile storage medium, e.g., a hard drive. In any such cases, the DCN parameters and rules may be retrievable from a flat file or relational database, or any suitable data repository scheme. The DCN parameters may include, for example, an alias that refers to optical communication system implementation (e.g., "South American West-Coast Optical Communication System"), an IP address range, and a value representing the number of stations associated with a given optical communication system. As discussed further below, the number of stations may be used to dynamically generate GUI controls that allow manipulation and editing of the settings associated with each station. The user 308 may adjust the alias values to more conveniently identify each station and settings/devices associated with the same. This allows the optical communication system 100, and more specifically the NMS 304, to provide a flexible mechanism by which the user 308 can easily distinguish the settings pertaining to one station over other stations. The example GUI 400 shown in FIG. 4A illustrates one such example of this aliasing and configuration mechanism, and is discussed in greater detail below.

The DCN parameters and rules database 310 may further include user-configurable rules. In some cases, the user-configurable rules may define how blocks of available IP addresses within a given station are allocated to various device types. For instance, the user-configurable rules may define subranges of IP addresses that are reserved for particular device types, such as a first subrange for VoIP phones and a second subrange for computer workstations and laptops.

The network element database 312 may include, for example, a plurality of previously generated configuration files and settings templates. As previously discussed, a plurality of configuration files may be generated in a batch fashion, a per-station fashion, or individually for one or more selected network elements. This export granularity may be achieved using the graphical user interface 400. The NMS 304 may store the generated configuration files for later reference and for the purpose of, for example, validating a present configuration prior to generating a new configuration file (e.g., to add a network element). The settings templates of the network element database 312 may define manufacturer/device specific configuration formats that enable the DCN provisioning interface 306 to output configuration files compatible with a given network element. Network elements of the optical communication system 100 are not necessarily homogenous devices even among a specific category of devices, such as VoIP phones. To account for varying configuration file formats, the network element database 312 may store templates that allow the DCN provisioning interface 306 to output a configuration file tailored to the specific format requirements imposed by a target device. Thus, the network element database 312 enables the DCN provisioning interface 306 to have so-called "expert knowledge" of target devices when selecting a particular settings format to output.

In an embodiment, the user 308 may access the DCN provisioning interface 306 directly through the use of GUI screens presented by the NMS system 304. The user 308 may also access the DCN provisioning interface 306 remotely using, for example, a laptop, a smartphone, or other suitable computing device. In some cases, the NMS 304 hosts a webserver that services hypertext transfer protocol (HTTP) requests. Accordingly, the user 308 may access webpage-based GUI screens when performing DCN configuration tasks such as, for example, generating configuration files and auditing/validating configuration files.

Now turning to FIG. 4A one example GUI screen 400 of the DCN provisioning interface 306 is shown in accordance with an embodiment of the present disclosure. The GUI screen 400 is shown in a highly simplified manner for ease of description and practicality. Aspects of the GUI screen 400 may be better understood within the context of a particular example task, and one example scenario will now be discussed in regard to staging and deployment of the optical communication system 100.

Consider an example scenario wherein the optical communication system 100 has not been provisioned with Ethernet addresses. In this example scenario, a number of stations may be pre-planned, such as CLS-A to CLS-F, with each station being staged in a manufacturing facility. It may not be practical to stage each station at exactly the same time due to the number of elements destined for each site and the complexity of each installation. Staging of equipment includes, for example, unboxing elements and mounting the same in racks or other configurations that approximate how the elements will be installed within a station. Staging may thus also include testing network connectivity between elements, cutting network cables to length, and configuration of wireless access points. Staging may also include testing power feed equipment (PFE), backup generators, uninterruptable power supplies (UPSs), and so on. In any event, the stations may be staged in a staggered order that allows each station to be setup in a controlled environment to ensure that deployment to the actual location of a station goes relatively efficiently and smoothly.

However, one issue facing such staged deployment is the provisioning of IP addresses in a uniform, conflict-free manner. The DCN provisioning interface 306 may thus be used to ensure that the distributed network collectively defined by the optical communication system, namely the DCN, is without address conflicts as each station is setup in relative isolation, tested, and shipped for final installation.

Therefore, and continuing with FIG. 4A, the GUI screen 400 may provide a top-down approach to IP address allocation and provisioning. The GUI screen 400 allows for a DCN model to be constructed based on user input and other parameters and rules within the DCN parameters and rules database 310. Continuing on, the GUI screen 400 includes a plurality of system-level input fields/parameters, e.g., text-boxes, including a project name 402, an IP range 404, and a number of stations 406. The project name 402 may be an alias that references the particular geographical location of the optical communication system such as, for example, "South America West Coast Network." The IP range 404 may be an IPv4 or IPv6 address such as 10.27.0.0/24, or another suitable IP address and netmask (CIDR) notation. As discussed below, the particular IP range 404 is later validated against the number of stations 406 to ensure an adequate number of subnets are available. Continuing on, the number of stations 406 may be manually entered by the user 308, or retrieved from a configuration file.

With the input parameters 404 to 406 set, the user 308 may then press the set locations button 408. In response, the GUI screen 400 may then populate a station aliases list 416 with a number of aliases that correspond to the number of stations 406. Each of the aliases within the station alias list 416 may be modified by the user such that each alias corresponds to a desired station. For example, the user 308 may set Alias1 to "Colombia," or another desired name. In some cases, each station alias is used, at least in part, when assigning hostnames to network elements. In addition to populating the station alias list 416, the GUI 400 may further populate the tab control 418 as shown, with the tab control 418 providing a separate tab panel that represents each of the station aliases. Changes made to the station aliases via the station alias list 416 may dynamically cause corresponding updates to the tab control 418 based on a user pressing the set location aliases button 410, for example. Each tab of the tab control 418 may be populated with various controls and settings that are associated with the station represented by the tab. The user 308 may then add, remove and update network elements associated with each station. Some example tab controls are discussed further below with regard to FIGS. 4B and 4C.

Once the user 308 completes desired adjustments to the DCN model via the tab control 418, the user may then select the "create files" button 412 to generate a set of configuration files for each of the network elements in accordance with the DCN model. As discussed below, the configuration files are created using the IP range 404 in addition to other parameters within the DCN parameters and rules database 310.

In an embodiment, the user 308 may select the audit files button 414 to perform validation/auditing of previously-created configuration files, with the previously-created configuration files loaded through the load project button 422. The previously-created configuration files may have been manually generated without the benefit of the DCN provisioning interface 306, or may have been generated in combination with the DCN provisioning interface 306, or both. In the event validation fails, the GUI screen 400 may present a visualization such as dialog window explaining the failure, or other type of alert such as an audible sound. For example, if an IP address conflict is detected among the configuration files, the GUI 400 may indicate this error to the user. The save project button 420 may be used to store the various settings such as the project name 402, IP range 404, and number of stations 406 into a database or other repository such as a flat file. Likewise, the save project button 420 may save the generated configuration files into the network element database 312.

Figure 4B:
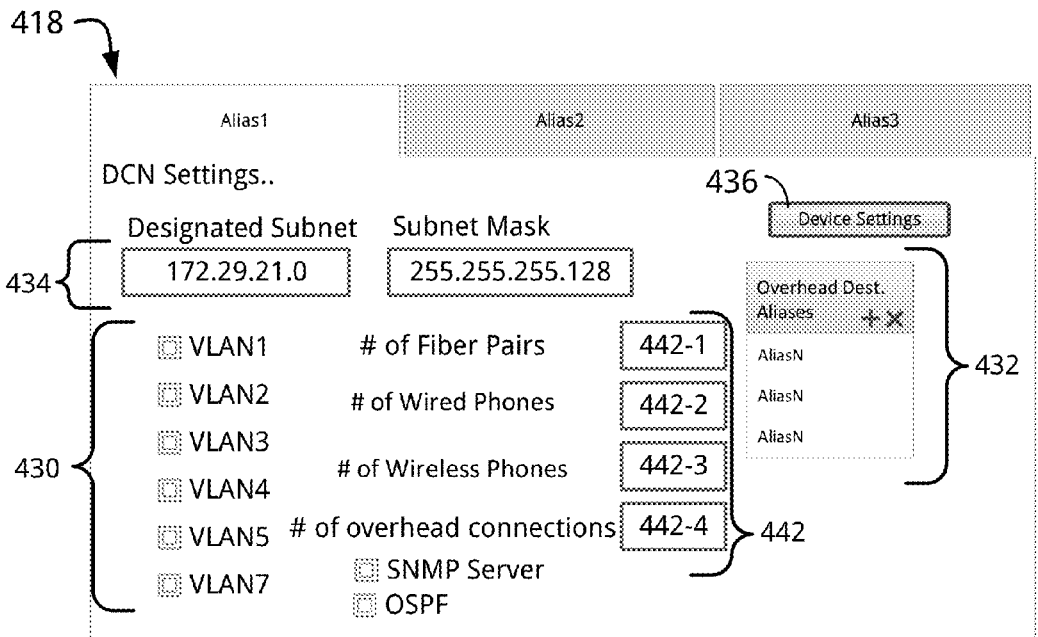

Turning FIG. 4B, an example tab 418 is shown in accordance with an embodiment of the present disclosure. As shown, the example tab 418 includes a designated subset and subnet mask 434, VLAN selections 430, overhead destination alias list 432, and device input parameters 442. The designated subset and subset mask 434 determine the IP address scheme and range of addresses available for the associated station. For example, the designated subnet 172.29.21.0 and netmask 255.255.255.128 provides 126 host addresses ranging between 172.29.21.1 and 172.29.21.126. Other subnet values may be utilized and the provided example should not be construed as limiting. The VLAN selections 430 may specify which fiber pair is associated with a given VLAN. In some cases, each fiber pair may have its own assigned VLAN to communicate with its corresponding shelves (e.g., racks of computer equipment) in the equipment bays within each location.

Continuing with FIG. 4B, and as shown, the device input parameters 442 include a number of textboxes that allow the GUI 400 to receive user-configurable values. For example, the number of fiber pairs 442-1 may indicate the number of fiber pairs that are coupled to the station. In some cases, the number of fiber pairs 442-1 determines the total number of VLANs configured for a given location. The number of wired phone 442-2 and wireless phones 442-3 indicate the total number of phones associated with a given station. These values allow the DCN provisioning interface 306 to reserve a number of IP addresses for use. The number of overhead connections 442-4 may set the number of optical Ethernet port connections a given station is associated with, and more particularly, the number of point-to-point connections to maintain between other stations. To this end, the overhead destination aliases 432 may dynamically populate with a number of destination aliases, with the total number corresponding to the number of overhead connections 442-4.

In some cases, N number of fiber pairs connect locations together. For example, in some cases a location may have two or more fiber pairs connecting the location to an adjacent location for the purpose of providing redundancy. In these cases, each fiber pair may include multiple line cards, with each line card having a different associated channel wavelength. As previously discussed, an overhead channel may be assigned a specific channel wavelength, and therefore, multiple overhead channels may exist per fiber pair. For purpose of interconnecting locations, at least one overhead channel may connect locations in a point-to-point fashion. Two separate fiber pairs may be used to provide redundant point-to-point overhead connections.

Figure 4C:
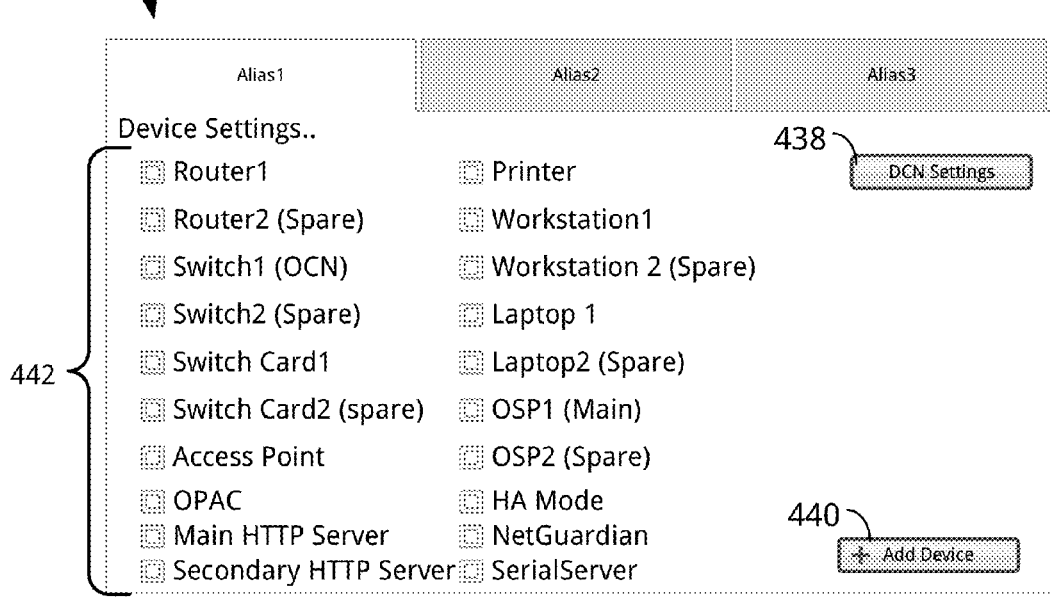

The device settings button 436 may enable yet further views within the tab control 418. For example, selecting the device settings button 436 may cause the DCN provisioning interface 306 to display additional controls and component, such as shown in FIG. 4C. As shown, device buttons 442 may be displayed that allows the user 308 to configure the devices that will be present within a given station. As discussed above, the device list may be based on a template that provides a number of default devices for selection. Likewise, each of the devices may be associated with device templates stored in the network element database 312. The device templates may include, for example, manufacturer specific information (e.g., model number), and a set of parameters that allows the DCN provisioning interface 306 to generate configuration files in a manner that comports with requirements of a particular device. For example, the parameters may include an XML format that is compatible with a given device. A user may further add additional devices (or device templates) by selecting the "add device" button 440. The DCN settings button 438 allows the user 308 to navigate back to the DCN settings screen shown in FIG. 4B. The buttons associated with each of the device buttons 442 may cause additional user interface screens (not shown) to be displayed. The additional screens may include additional configurable aspects such as, for example, MAC addresses and any other configuration parameter associated with a given device.

The example user interface screens illustrated in FIGS. 4A-4C are provided merely for illustration and should not be construed as limiting the present disclosure. For example, other user interface controls and features may be implemented and are within the scope of this disclosure.

Architecture and Methodology

While flowcharts presented herein illustrate various operations according to example embodiments, it is to be understood that not all of the depicted operations are necessary for other embodiments. Indeed, it is fully contemplated herein that in other embodiments of the present disclosure, the depicted operations, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Figure 5:
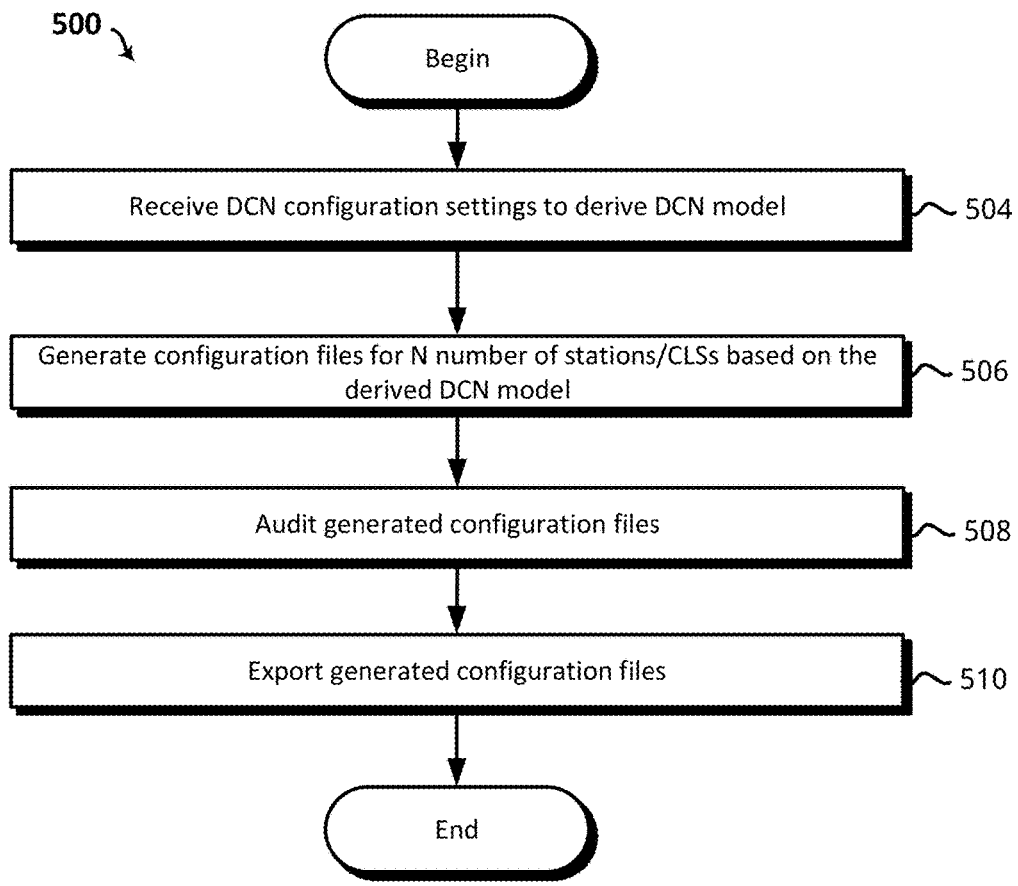
FIG. 5 shows an example process flow for provisioning a DCN in accordance with an embodiment of the present disclosure.
Figure 6:
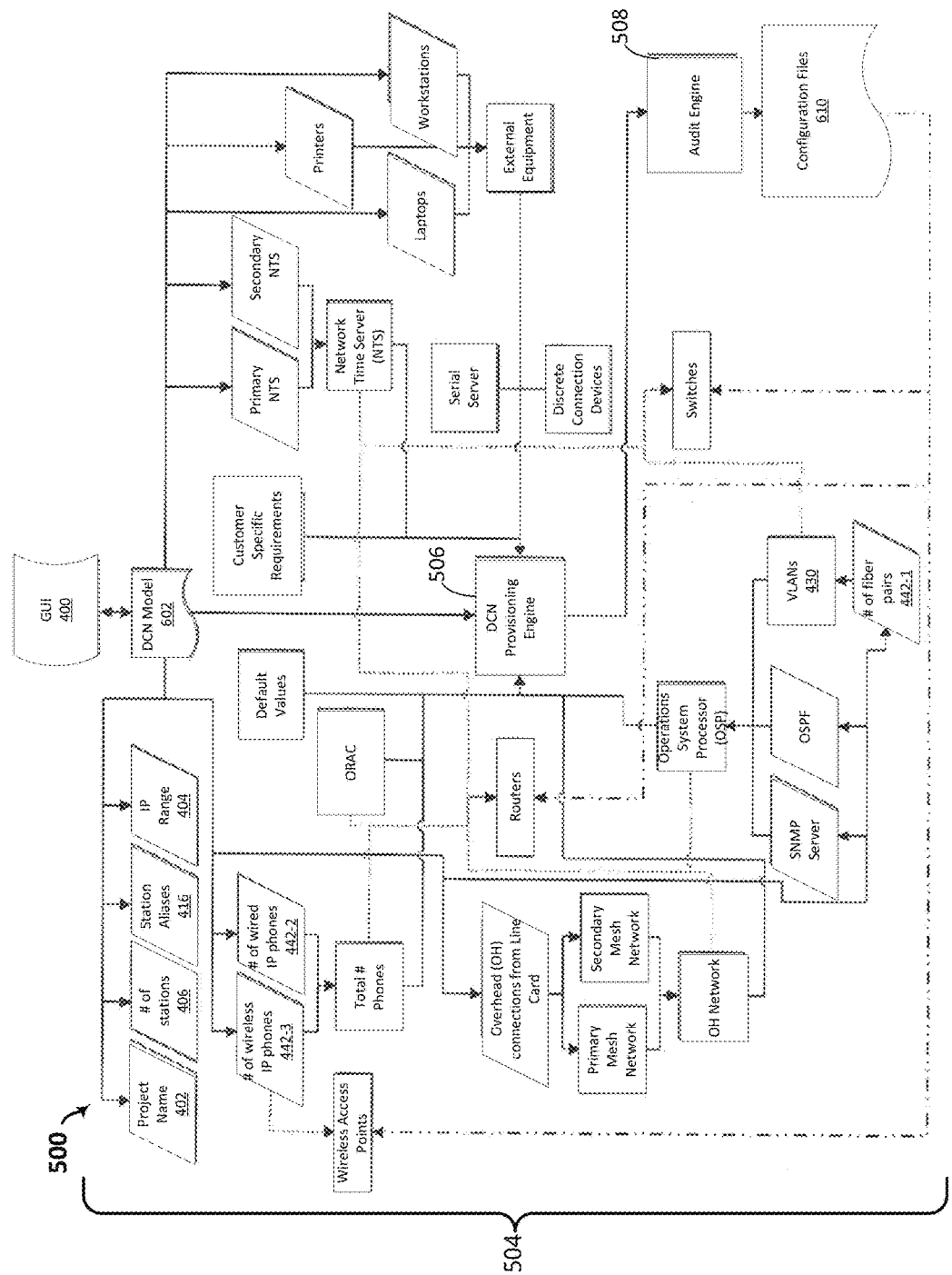
FIG. 6 shows an example process model and flow for the process of FIG. 5 in accordance with an embodiment of the present disclosure.

Turning to FIG. 5, with additional reference to FIG. 6, a flow chart is shown that illustrates one DCN provisioning process 500 useful in connection with a system and method consistent with the present disclosure. The example DCN provisioning process 500 may be carried out by the by the controller 902 of the computing system of FIG. 9, or any other suitable computing system such as the NMS server 304. In any such cases, the example DCN provisioning process 500 may be carried out in hardware or software, or both. The acts of the DCN provisioning process 500 may not necessarily be executed in the order given, and moreover, some acts may be omitted, added or otherwise augmented depending on a desired implementation.

DCN provisioning interface 306 In act 504, the controller 902 receives DCN configuration settings to derive a DCN model 602 (FIG. 6). For example, the controller 902 may instantiate the GUI screen 400 to receive user-supplied settings. The settings may include, for example, a project name 402, IP range 404, number of stations 406, station aliases 416. In addition, the settings may include any number settings that correspond to the network elements associated with each station.

FIG. 6 shows an example process flow which illustrates act 504 and how the GUI 400 may receive a plurality of configuration parameters in accordance with an embodiment. As previously discussed, some aspects and embodiments are particularly well suited for design-phase, or "staging" of the optical communication system. In this context, the controller 902 can receive configuration parameters from existing configuring files, e.g., previously generated by the DCN provisioning interface 306 or manually created by a user/technician, from the GUI screen 400, or from any combination thereof.

Returning to FIG. 5, and in act 506, the controller 902 generates configuration files for N number of stations based on the DCN model 602. In an embodiment, the controller 902 uses a DCN provisioning engine provided by the DCN provisioning interface 306 to generate configuration files for each network element by performing one or more API calls, for example. In an embodiment, the controller 902 generates configuration files based on the various parameters received by the GUI 400 and the various DCN parameters and rules stored in the DCN parameters and rules database 310. Thus, in a general sense, allocation of IP addresses is based on a priori knowledge of the desired topology of the optical communication system 100 in view of, for example, IP addresses for point-to-point connections, for ORAC (if present), phone equipment, VLANs, SNMP-servers, and so on.

In some cases, mission-critical intra-station communication, such as subnets for ORACs and VoIP phones, may be configured, e.g., based on rules within the DCN rules and parameters database 310, to use fiber pairs/overhead channels that provide high availability and a low-number of hops to ensure route optimization, e.g., low latency connectivity and redundancy. As should be appreciated in light of this disclosure, ORACs may comprise microprocessor based circuitry configured to be deployed in the optical communications system 100 to provide fault detection and recovery when there are fiber and/or cable breaks. Thus, an ORAC may perform adjustments of optical loading tones, for example, and may allow recovery of the channel wavelengths not physically impacted by the fiber/cable break. Thus, such mission-critical network elements may be automatically provisioned with a configuration that ensures optical communication, e.g., a low number of hops, and optical communication path redundancy, e.g., multiple routes and backup fiber pairs. In addition, some fiber pairs may form so-called "express" routes whereby they directly couple two or more locations without branching or otherwise being shared by other locations. Thus, the optical communication system 100 may implement rules within the DCN rules and parameters database 310 to ensure that certain network elements (e.g., VoIP phones, ORACs) are provisioned to utilize such express fiber pairs/routes.

In addition, the generated settings files may further include hostnames that are determined, at least in part, based on the project name or station alias, for example, depending on where the network element resides. One specific example of the DCN provisioning engine process 506 is discussed in greater detail below with regard to FIGS. 7 and 8.

In act 508, the controller 902 audits the generated configuration files. In some cases, the controller 902 uses an audit engine provided by the DCN provisioning engine interface 306 by performing one or more API calls, for example. If an error or misconfiguration is detected, the controller 902 may provide an alert (e.g., a pop-up window) to a user. For example, if the controller 902 detects an IP address conflict, whereby two or more network elements have the same assigned IP address, the controller 902 may alert the user to the conflict by instantiating a dialog window, for example. Likewise, if the controller 902 detects a network element includes an IP address outside of the assigned IP range and netmask for a given station, the controller 902 may also alert the user to the misconfiguration via a dialog window.

In act 510, the controller 902 causes to be exported the generated configuration files 610. As previously discussed with regard to FIG. 4A, configuration files may be exported as separate files. The files may be sorted in subdirectories, with each subdirectory label corresponding to an associate station alias. In an embodiment, a technician provisions each network element with a corresponding settings file generated by the controller 902. In some cases, exporting of generated configuration files may include transmitting settings files to each network element using the DCN.

Figure 7:
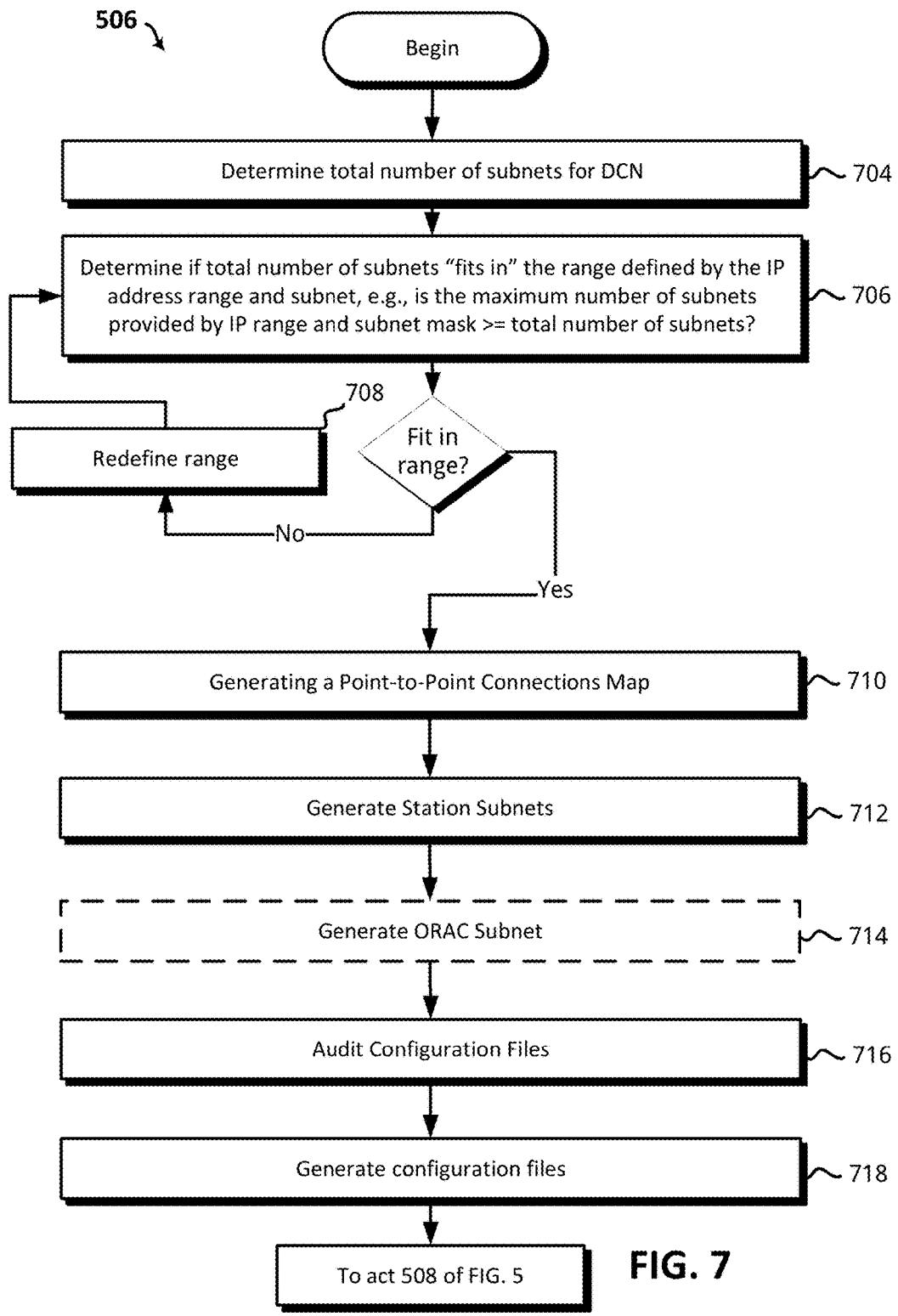
FIG. 7 shows an example process flow for a DCN provisioning engine in accordance with an embodiment of the present disclosure.
Figure 8:
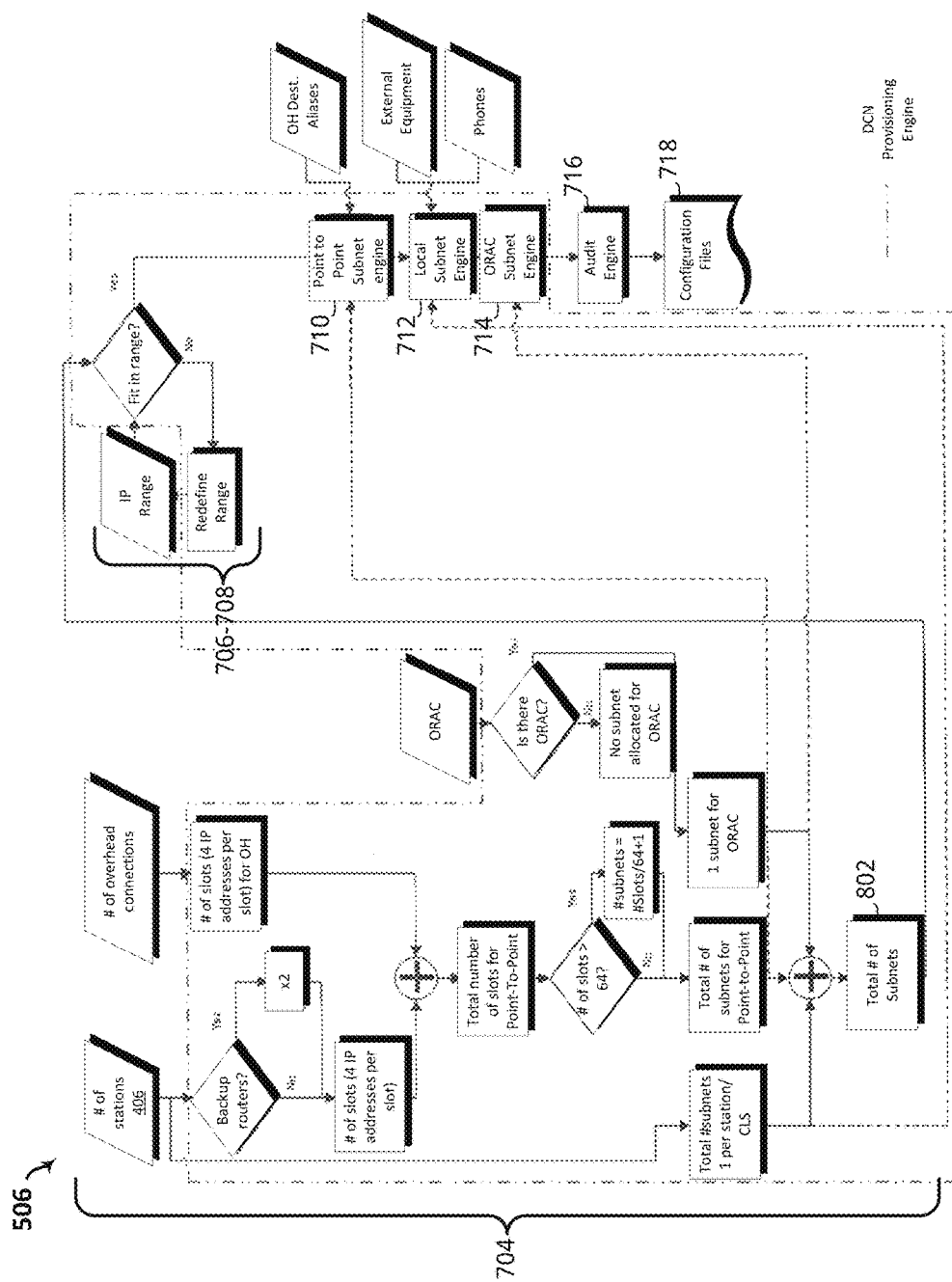
FIG. 8 shows an example process model and flow for the process of FIG. 7 in accordance with an embodiment of the present disclosure.

FIG. 7, with additional reference to FIG. 8, is a flow chart illustrating one DCN provisioning engine process 506 useful in connection with a system and method consistent with the present disclosure. The DCN provisioning engine process 506 may be carried out by the by the controller 902 of the computing system of FIG. 9, or any other suitable computing system such as the NMS server 304. In any such cases, the example DCN provisioning engine process 506 may be carried out in hardware or software, or both. The acts of the DCN provisioning engine process 506 may not necessarily be executed in the order given, and moreover, some acts may be omitted, added or otherwise augmented depending on a desired implementation.

In act 704, the controller 902 determines the total number of subnets for the DCN. As shown in FIG. 8, performance of act 704 may include determining the total number of stations based on, for example, the total number of stations 406 entered into the GUI screen 400 by the user 308. In the event backup routers are utilized, the total number of stations 406 may be multiplied by two (2). In any event, the controller 902 determines a total number of slots for point-to-point connections, e.g., overhead channels. In some cases, the total number of IP addresses per slot is 4, although other embodiments are within the scope of this disclosure. In a general sense, a slot may be correctly understood as a "slice" or reserved portion of a given IP range to accommodate overhead channels. Accordingly, and in the context of the immediate example, 4 IP addresses in a subnet may be reserved for each defined overhead channel. Accordingly, in a given subnet range, e.g., 0 to 255, a maximum number of overhead channels is a function of slot allocation. For instance, up to 64 overhead channels may be defined for a total of 64 slots. In the event additional slots are needed (e.g., total number of slots>64), then the controller 902 may need to provision an additional subnet. Thus, the total number of subnets for point-to-point connections may be as little as 1 subnet, or as many as needed to accommodate the total number of slots for point-to-point connectivity. As should be appreciated in light of this disclosure, slot allocation may be also based on IPv6 addresses, and thus, the provided examples should not be construed as limiting.

Continuing on, the total number of subnets 802 is then derived by summing the total number of subnets to accommodate one station subnet per location, the total number of subnets for point-to-point connections, and the one subnet for ORAC (if present).

Returning of FIG. 7, and in act 706, the controller 902 determines if the total number of subnets 802 determined in act 704 "fits in" the range defined by the IP address range and subnet 434. For example, and stated differently, performance of act 704 determines if the maximum number of subnets provided by the IP range and subnet mask 434 is greater than or equal to the total number of subnets 802. In the event the total number of subnets 802 exceeds the defined IP address range 434, then the controller 902 continues to act 708 and redefines the range. In some cases, the controller 902 redefines the range by adjusting the netmask to include additional network addresses. For example, the subnet mask may be adjusted, e.g., 172.29.21.0/25 to /24 to increase hosts to 254, to provide more network addresses at the expense of host addresses. In the event the total number of subnets 802 "fits" within the defined IP address range 434, the controller 902 continues to act 710.

In act 710, the controller 902 generates a map of point-to-point connections in memory based on the overhead destination aliases 432 associated with each station. For example, CLS-A may map with point-to-point connections to CLS-B and CLS-C. Likewise, CLS-B may be mapped with point-to-point connections to CLS-C and CLS-E. Thus, the point-to-point connection map builds a table in memory with each station and its associated list of stations for point-to-point. As previously discussed, the user 308 set the point-to-point connections based on station aliases. The controller 902, in turn, may convert the aliases to IP addresses. Thus, the user does not have to necessarily track or otherwise understand IP addresses and instead may simply utilize the station aliases.

In act 712, the controller 902 generates station subnets or local station subnets for each of the stations. In an embodiment, performance of act 712 sets the designated subnet and subnet mask 434. Stated differently, performance of act 712 may assign each station with a particular subnet and subnet mask that may appear in the tab control 418 of the GUI screen 400. Thus, the DCN provisioning interface 306 may distribute subnets according to the established range 434 in view of the rules within the DCN parameters and rules database 310. For example, rules may define subnet allocations for various elements based on the hierarchy of the optical communication system and the various host requirements (e.g., the number of IP addresses needed to accommodate network elements at each location). For instance, a subnet of 255.255.255.252 may be assigned for overhead or on-cable subnets, 255.255.255.248 for ORAC subnets (if present), and 255.255.255.128 for all other subnets such as station subnets.

Also in act 712, the controller 902 assigns each network element one or more IP addresses, e.g., an IPv4 and/or IPv6 address, in accordance with a designated subnet and subnet mask for the particular station.

In act 714, the controller 902 generates a designated ORAC subnet and subnet mask if an ORAC is present in the optical communication system 100. In act 716, the controller 902 may audit the assigned IP addresses/subnet masks in a manner substantially similar to that of act 508 discussed above, and for this reason will not be repeated for the purpose of brevity.

In an embodiment, the generated configuration files 718 may be exported as individual files, or in batch (e.g., a zip file). Alternatively, or in addition to exporting generated configuration files 718, a report may be printed out or otherwise presented to a user. The report may include each station along with their respective designated subnet and subnet masks, network elements, and overall device configuration.

While flowcharts presented herein illustrate various operations according to example embodiments, it is to be understood that not all of the depicted operations are necessary for other embodiments. Indeed, it is fully contemplated herein that in other embodiments of the present disclosure, the depicted operations, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Example Computer System

Figure 9:
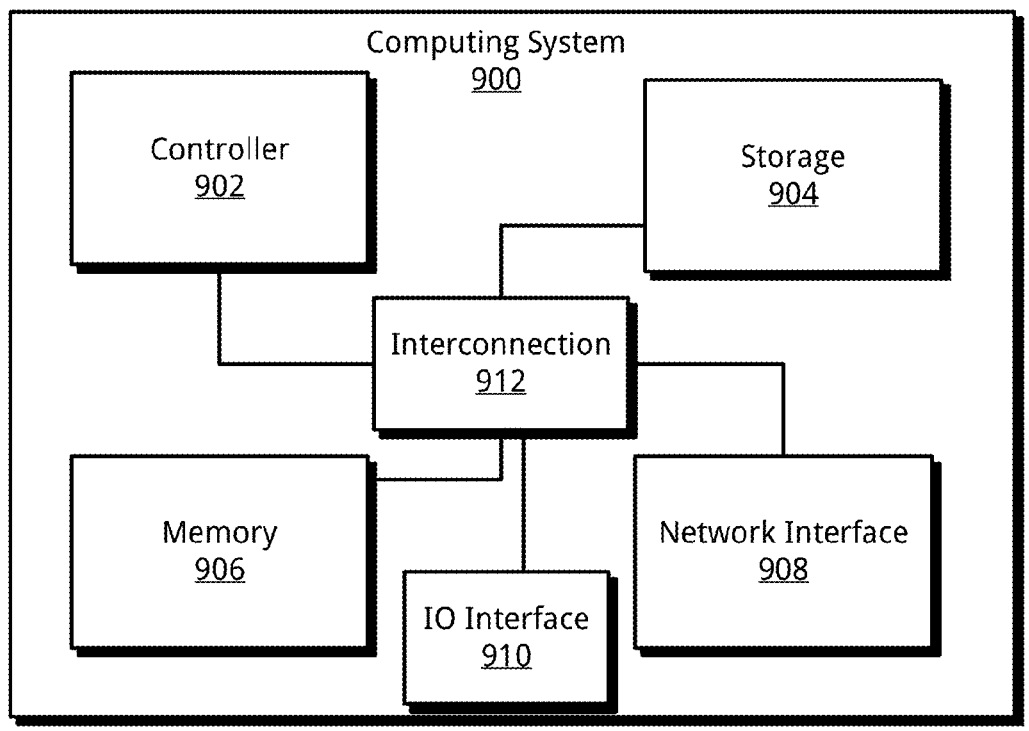
FIG. 9 shows an example computing system configured to perform DCN configuration processes in accordance with various embodiments of the present disclosure.

FIG. 9 illustrates a computing system 900 configured to execute DCN configuration processes, e.g., the processes 500 and 506 of FIGS. 5-8, in accordance with techniques and aspects provided in the present disclosure. As can be seen, the computing system 900 houses a processor 902 or controller, a data storage device 904, a memory 906, a network interface 908, an IO interface 910 and an interconnection element 912. To execute at least some aspects provided herein, the controller 902 receives and performs a series of instructions that result in the execution of routines and manipulation of data. In some cases, the processor is at least two processors. In some cases, the processor may be multiple processors or a processor with a varying number of processing cores. The memory 906 may be random access (RAM) and configured to store sequences of instructions and other data used during the operation of the computing system 1000. To this end, the memory 906 may be a combination of volatile and non-volatile memory such as dynamic random access memory (DRAM), static memory (SRAM), or flash memory, etc. The network interface 908 may be any interface device capable of network-based communication. Some examples of such a network interface include an Ethernet, Bluetooth, Fibre Channel, Wi-Fi and RS-232 (Serial). The data storage device 904 includes any computer readable and writable non-transitory storage medium. The storage medium may have a sequence of instructions stored thereon that define a computer program that may be executed by the controller 902. In addition, the storage medium may generally store data in contiguous and non-contiguous data structures within a file system of the storage device 904. The storage medium may be an optical disk, flash memory, a solid state drive (SSD), etc. During operation, the computing system 900 may cause data in the storage device 904 to be moved to a memory device, such as the memory 906, allowing for faster access. The IO interface 910 may be any number of components capable of data input and and/or output. Such components may include, for example, a display device, a touchscreen device, a mouse, a keyboard, a microphone, external device (USB, fire wire, etc.) and speakers. The interconnection element 912 may comprise any communication channel/bus between components of the computing system 900 and operate in conformance with standard bus technologies such as USB, IDE, SCSI, PCI, etc.

Although the computing system 900 is shown in one particular configuration, aspects and embodiments may be executed by computing systems with other configurations. As discussed above, some embodiments include a controller 906 comprising a tablet device. Thus, numerous other computer configurations and operating systems are within the scope of this disclosure. For example, the computing system 900 may be a propriety computing device with a mobile operating system (e.g., an Android device). In other examples, the computing system 900 may implement a Linux/Unix, Windows®, or Mac OS® operating system. Many other operating systems may be used, and examples are not limited to any particular operating system.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. As used herein, use of the term "nominal" or "nominally" when referring to an amount means a designated or theoretical amount that may vary from the actual amount.

In one aspect of the present disclosure a computer-implemented method for provisioning network elements in an optical communication system is disclosed. The method comprising receiving a plurality of configuration parameters to derive a data communications network (DCN) model, the DCN model defining a communications network implementable by a target cable system that includes at least one optical cable coupled between a first and second cable landing station, and generating a plurality of configuration files based at least in part on the derived DCN model, wherein the plurality of generated configuration files defines an on-cable subnet for intra-station packet routing, and a plurality of station subnets for providing data connectivity between network elements associated with each station of the target cable system and a DCN implemented within the target cable system.

In another aspect of the present disclosure a computer-readable medium having a plurality of instructions encoded thereon that when executed by at least one processor cause a process to be carried out is disclosed. The process configured to receive a plurality of configuration parameters to derive a data communications network (DCN) model, the DCN model defining a communications network implementable by a target cable system that includes at least one optical cable coupled between a first and second cable landing station, and generate a plurality of configuration files based on the derived DCN model, wherein the plurality of generated configuration files defines an on-cable subnet for intra-station packet routing, and a plurality of station subnets for providing data connectivity between network elements associated with each station of the target cable system and a DCN implemented within the target cable system.

In yet another aspect of the present disclosure an optical cable system is disclosed. The system comprising a network management system (NMS) for managing a plurality of network elements communicatively coupled to a data communications network (DCN) implemented by the optical cable system, a DCN engine implemented by the NMS and configured to receive a plurality of configuration parameters to derive a DCN model implemented by the optical cable system, receive a plurality of previously-generated configuration settings for at least one station associated with the optical cable system, and generate a new configuration file corresponding to a new network element based on the derived DCN model and the received plurality of previously-generated configuration settings.

While the principles of the disclosure have been described herein, it is to be understood by those skilled in the art that this description is made only by way of example and not as a limitation as to the scope of the disclosure. Other embodiments are contemplated within the scope of the present disclosure in addition to the embodiments shown and described herein. Modifications and substitutions by one of ordinary skill in the art are considered to be within the scope of the present disclosure, which is not to be limited except by the following claims.

What is claimed is:

1. A computer-implemented method for provisioning network elements in an optical communication system, the method comprising:
  receiving a plurality of configuration parameters to derive a data communications network (DCN) model, the DCN model defining a communications network implementable by a target cable system that includes at least one optical cable coupled between a first and second cable landing station; and
  generating a plurality of configuration files based at least in part on the derived DCN model, each of the plurality of configuration files for deployment on an associated network element to provision the associated network element with an internet protocol (IP) address,
  wherein the plurality of generated configuration files collectively define an on-cable subnet for intra-station packet routing without an IP address conflict, and a plurality of station subnets for providing data connectivity between network elements associated with each station of the target cable system and a DCN implemented within the target cable system.

2. The computer-implemented method of claim 1, wherein the plurality of configuration parameters comprises an internet protocol (IP) range and a total number of stations associated with the DCN model.

3. The computer-implemented method of claim 2, wherein the target cable system comprises an undersea cable system.

4. The computer-implemented method of claim 1, wherein the on-cable subnet comprises a mesh network topology.

5. The computer-implemented method of claim 1, wherein the plurality of configuration parameters comprises a plurality of user-configurable station aliases.

6. The computer-implemented method of claim 1, wherein each of the network elements is associated with at least one of an IP version 4 (IPv4) or IP version 6 (IPv6) network address.

7. The computer-implemented method of claim 1, wherein each station of the target cable system is associated with at least one unique station subnet, and wherein generating the plurality of configuration files further comprises determining if a maximum number of subnets provided by a predetermined subnet and subnet mask for the DCN model is sufficient to provide each station with the at least one unique station subnet, and in response to determining the maximum number of subnets provided by the predetermined subnet and subnet mask for the DCN model is insufficient, redefining the predetermined subnet and subnet mask to increase the maximum subnets.

8. The computer-implemented method of claim 7, wherein the at least one unique station subnet comprises one or more subnets associated with point-to-point connections with other stations of the target cable system.

9. The computer-implemented method of claim 1, wherein generating the plurality of configuration files further includes generating a point-to-point connections map, the point-to-point connections map associating each station of the target cable system with one or more subnets corresponding to other stations of the target cable system.

10. The computer-implemented method of claim 1, wherein the on-cable subnet comprises a point-to-point network.

11. The computer-implemented method of claim 1, further comprising:
  receiving a plurality of previously-generated configuration files;
  identifying a misconfiguration within the plurality of previously-generated configuration files, the misconfiguration comprising at least one of a conflicted internet protocol (IP) address and/or an IP address outside of a range governed by an associated subnet and subnet mask; and
  providing an alert to a user in response to identifying the misconfiguration.

12. A non-transitory computer-readable medium having a plurality of instructions encoded thereon that when executed by at least one processor cause a process to be carried out, the process configured to:
- receive a plurality of configuration parameters to derive a data communications network (DCN) model, the DCN model defining a communications network implementable by a target cable system that includes at least one optical cable coupled between a first and second cable landing station; and
- generate a plurality of configuration files based on the derived DCN model, each of the plurality of configuration files for deployment on an associated network element to provision the associated network element with an internet protocol (IP) address,
- wherein the plurality of generated configuration files collectively define an on-cable subnet for intra-station packet routing without an IP address conflict, and a plurality of station subnets for providing data connectivity between network elements associated with each station of the target cable system and a DCN implemented within the target cable system.

13. The computer-readable medium of claim 12, wherein the plurality of configuration parameters comprises an internet protocol (IP) range and a total number of stations associated with the DCN model.

14. The computer-readable medium of claim 13, wherein the target cable system comprises an undersea cable system.

15. The computer-readable medium of claim 12, the process further configured to:
- receive a plurality of previously-generated configuration files;
- identify a misconfiguration within the plurality of previously-generated configuration files, the misconfiguration comprising at least one of a conflicted internet protocol (IP) address and/or an IP address outside of a range governed by an associated subnet and subnet mask; and
- provide an alert to a user in response to identifying the misconfiguration.

16. An optical cable system comprising:
- a network management system (NMS) for managing a plurality of network elements communicatively coupled to a data communications network (DCN) implemented by the optical cable system;
- a DCN engine implemented by the NMS and configured to:
  - receive a plurality of configuration parameters to derive a DCN model implemented by the optical cable system;
  - receive a plurality of previously-generated configuration settings for at least one station associated with the optical cable system; and
  - generate a new configuration file corresponding to a new network element based on the derived DCN model and the received plurality of previously-generated configuration settings, the new configuration file for deployment on the new network element to provision the associated network element with a unique internet protocol (IP) address.

17. The optical cable system of claim 16, wherein the plurality configuration parameters comprise an internet protocol (IP) range and a total number of stations associated with the DCN model.

18. The optical cable system of claim 16, wherein the optical cable system comprises an undersea optical cable system.

19. The optical cable system of claim 16, wherein the DCN engine is further configured to audit the plurality of previously-generated configuration settings to determine if two or more network elements have a conflicted internet protocol (IP) address.

20. The optical cable system of claim 19, wherein the DCN engine is further configured to present an alert to a user in response to determining that two or more network elements have a conflicted IP address.

* * * * *